US005802955A

United States Patent [19]

Stoll et al.

[11] Patent Number: 5,802,955

[45] Date of Patent: Sep. 8, 1998

[54] CORROSION RESISTANT CERMET WEAR PARTS

[75] Inventors: William M. Stoll, Ligonier; James P. Materkowski; Ted R. Massa, both of Latrobe, all of Pa.

[73] Assignee: Kennametal Inc., Latrobe, Pa.

[21] Appl. No.: 585,080

[22] Filed: Jan. 11, 1996

Related U.S. Application Data

[62] Division of Ser. No. 398,039, Mar. 3, 1995.

[51] Int. Cl.[6] ........ F16J 9/00

[52] U.S. Cl. ........ 92/248

[58] Field of Search ........ 92/248

[56] References Cited

U.S. PATENT DOCUMENTS

| | | | |
|---|---|---|---|
| 3,746,456 | 7/1973 | Hill | 401/215 |
| 3,785,783 | 1/1974 | Mynard et al. | 29/182.7 |
| 3,920,407 | 11/1975 | Mynard et al. | 29/182.3 |
| 4,308,059 | 12/1981 | Rymas | 75/240 |
| 4,574,011 | 3/1986 | Bonjour et al. | 75/241 |
| 4,610,931 | 9/1986 | Nemeth et al. | 428/547 |
| 5,476,531 | 12/1995 | Timm et al. | 74/240 |

FOREIGN PATENT DOCUMENTS

| | | |
|---|---|---|
| 2719532 | 11/1978 | Germany . |
| 61-261453 | 11/1986 | Japan . |
| 61-261455 | 11/1986 | Japan . |
| A647813 | 2/1985 | Switzerland . |
| 622041 | 4/1949 | United Kingdom . |
| 1082568 | 9/1967 | United Kingdom . |
| 1309634 | 3/1973 | United Kingdom . |
| 1393115 | 5/1975 | United Kingdom . |

OTHER PUBLICATIONS

Tracey, V.A., Mynard, B.A., "Development of Tungsten Carbide–Cobalt–Ruthenium Cutting Tools for Machining Steels," Metal Powder Industries Federation and American Powder Metallurgy Institute, (Conference), vol. 82, No. 1, 1981, USA, pp. 281–292, XP000574252, see pp. 285–286.

Jackson, J. S., Warren, R., Waldron, M. B., "Cemented Carbides with High Melting–Point Precious Metal Binder Phases," Prod. Tool Alloy Ltd. Pansee Seminar, vol. 2, No. 32B, 1974, England, pp. 1–15, XP000574369, see pp. 9–15.

"Designing with Kennametal", *Kennametal Publication No. B–222B (10) E7, (1967)*, pp. 1–48, Kennametal Inc., Latrobe, PA.

"Cemented Carbides with High–Melting–Point Precious–Metal Binder Phases", J. S. Jackson, R. Warren, & M. B. Waldron, *Powder Metallurgy,* vol. 17, No. 34 (1974), pp. 255–270.

"Cemented Carbide in High Pressure Equipment", B. Zetterlund, *High Pressure Engineering,* vol. 2 (1977), pp. 35–40.

Properties and Proven Uses on KENNAMETAL® Hard Carbide Alloys, *Kennametal Publication No. S82–5(5)B2 (1977)*, pp. 1–48, Kennametal Inc., Latrobe, PA.

"Ruthenium Boosts Carbides Capability", *Metalworking Production,* vol. 122, No. 6 (1978), p. 13.

"Care and Handling of Tungsten Carbide Plungers for Hyper Compressors", *Kennametal Publication No. A78–63(3) D8 (1978)*, pp. 1–13, Kennametal Inc., Latrobe, PA.

(List continued on next page.)

*Primary Examiner*—F. Daniel Lopez
*Attorney, Agent, or Firm*—Stanislav Antolin

[57] ABSTRACT

A corrosion resistant cermet comprises a ceramic component (e.g., WC) and a binder alloy comprised of a major component (e.g., one or more of iron, nickel, cobalt, their mixtures, and their alloys) and at least one additive component (e.g., one or more of ruthenium, rhodium, palladium, osmium, iridium, and platinum).

Plungers for hyper compressors used in the corrosive environments generated during the manufacture of low density polyethylene (LDPE) or ethylene copolymers are an example of the use of the corrosion resistant cermet.

35 Claims, 1 Drawing Sheet

OTHER PUBLICATIONS

"Ruthenium Exploits Its Precious Talent", K. Brookes, *Metalworking Production,* vol. 123, No. 7 (1979), pp. 77+ (three pages).

"Development of Tungsten Carbide–Colbalt & Ruthenium Cutting Tools for Machining Steels", V. A. Tracey & B. A. Mynard, *Modern Developments in Powder Metallurgy: Proceedings of the 1980 International Powder Metallurgy Conference, Jun. 22–27, 1980, Washington, DC,* Eds. H. H. Hausner, H. W. Antes, and G. D. Smith, vol. 14, pp. 281–292.

"High Pressure Technology", I. L. Spain *Kirk–Otuner Encyclopedia of Chemical Technology, Third Edition,* vol. 12 (1980), pp. 398–401, John Wiley & Sones, Inc., New York, NY.

"Stellram SA", K. J. A. Brookes, *World Directory and Handbook of Hardmetals,* Third Edition (1982), pp. 222–223, Engineers' Digest Limited and International Carbide Data, United Kingdom.

"Marshalls Hard Metals Limited", K. J. A. Brookes, *World Directory of Hardmetals,* Fourth Edition (1987), p. D120, International Carbide Data, United Kingdom.

"Stellram Societé Anonyme", K. J. A. Brookes, *World Directory of Hardmetals,* Fourth Edition (1987), pp. D171–D172, International Carbide Data, United Kingdom.

"Hardmetals and Cemets", P. Ettmayer, *Annual Review of Materials Science,* vol. 19 (1989, pp. 145–164.

"Structure of a Binding Phase in Re–Alloyed WC–Co Cemented Carbides", A. F. Lisovsky, N. V. Tkachenko, & V. Kebko, *Refractory Metals & Hard Materials,* vol. 10 (1991), pp. 33–36.

"Sintering of WC–10 Co Hard Metals Containing Vanadium Carbonitride and Rhenium—Part II: Rhenium Addition", R. Hulyal & G. S. Upadhyaya, *Refractory Metals & Hard Materials,* vol. 10 (1991), pp. 9–13.

"Marshalls Hard Metals Ltd", K. J. A. Brookes, *World Directory and Handbook of Hardmetals and Hard Materials,* Fifth Editions (1992), p. D135, International Carbide Data, United Kingdom.

"Stellram SA", K. J. A. Brookes, *World Directory and Handbook of Hardmetals and Hard Materials,* Fifth Edition (1992), pp. D187–D188, International Carbide Data, United Kingdom.

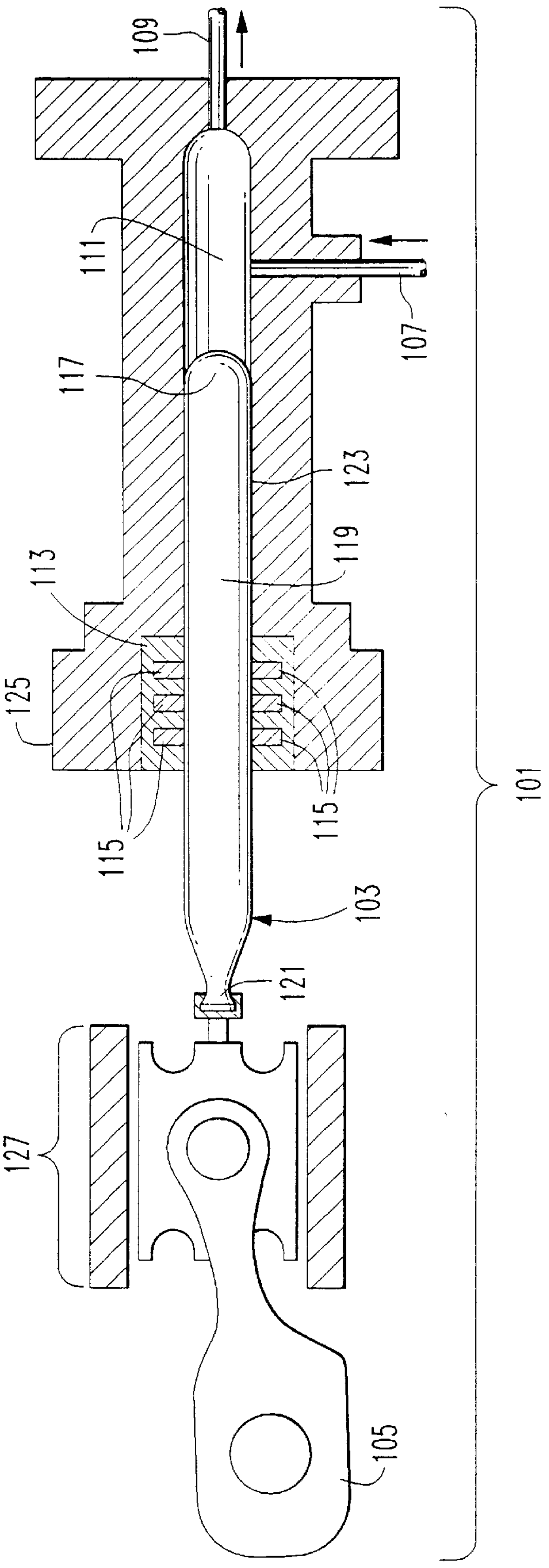
109
111
107
117
123
119
113
125
115
115
115
103
121
127
105
101

CORROSION RESISTANT CERMET WEAR PARTS

This is a divisional of copending application Ser. No. 08/398,039 filed on Mar. 3, 1995.

BACKGROUND

Cemented carbides, e.g., cobalt cemented tungsten carbide, have been used in a variety of non-cutting tool applications where the wear resistance, high elastic modulus, compressive strength, resistance to fracture, or any combination of the preceding provide a component with a long lifetime under conditions involving high temperature, pressure, or both in various environments. However, when these components are placed within a corrosive environment, the expected lifetime of the cemented carbide component can be significantly reduced. This can be of great concern when the cemented carbide components involved are (1) large and, therefore expensive; (2) used in equipment or a process where failure during use can cause significant damage; or (3) both.

For example, cobalt cemented tungsten carbide plungers have been used in hyper compressors used to produce the high gas pressures, for example, up to about 344 megapascal (MPa)(50,000 pounds per square inch (psi)). These high pressures as well as temperatures up to about 330° C. (626° F.) are required during the manufacture of materials such as low density polyethylene (LDPE). The high modulus of elasticity and resistance to buckling, deformation, fracture and wear of cobalt cemented tungsten carbide alloys, such as "K94™" cobalt cemented tungsten carbide or "KZ94™" cobalt cemented tungsten carbide, under these conditions, are responsible for the commercial success of cemented carbides in these applications ("Properties and Proven Uses of Kennametal Hard Carbide Alloys," Kennametal Inc. (1977) Pages 1–48). This success comes despite the cost of manufacturing and the degree of care required in handling, using, and maintaining plungers made of cemented carbides ("Care and Handling of Tungsten Carbide Plungers for Hyper Compressors," Kennametal Inc. (1978) Pages 1–12).

To truly appreciate the present invention, one must realize the degree of care required in manufacturing, handling, using, and maintaining plungers made of cemented carbides. In addition to possessing the appropriate mechanical and physical properties, a plunger is manufactured to exacting tolerances, with a typical surface finish of about 0.025 micrometer (one microinch) or better—a mirror-like finish. During handling and storage outside of a hyper compressor and use or while sitting idle in a hyper compressor, in addition to the wear a plunger experiences during use, the cemented carbide comprising a plunger is also subject to corrosion or leaching of binder (e.g., cobalt). This corrosion may affect the lifetime of the plunger. For example, during use corroded or leached areas can experience local frictional heating which induces heat stress cracking of the area. These difficulties are typically addressed by periodically dressing (e.g., grinding, honing, repolishing, or any combination of the preceding) the entire surface of a plunger to not only remove the corroded or leached areas from the surface but also reduce a plunger's diameter. The dressing of a plunger may be repeated until the diameter has been so reduced that a the plunger can no longer be used to pressurize a hyper compressor. In addition to localized frictional heating, corroded or leached areas also create stress intensifiers that effectively reduce the load bearing ability of a cemented carbide to the point that a plunger may fail during use.

During handling and storage, the corrosion or leaching of the binder from a commercially available cemented carbide plunger may be readily minimized by following prescribed practices. Furthermore, these commercially available cemented carbides have historically exhibited suitable corrosion resistant properties when used in hyper compressors to manufacture low density polyethylene (LDPE).

In recent years, however, the low density polyethylene industry has been developing improved low density polyethylene and copolymers of polyethylene. In addition to the traditional feedstock ingredients, such as initiators (e.g., oxygen, peroxides or azo compounds), chain transfer agents (e.g., alcohols, ketones, or esters), or both the most recent additional ingredients to the feedstock stream of a hyper compressor create a extremely aggressive environment that corrodes, leaches, or both the binder of commercially available cemented carbides.

For the forgoing reasons there is a need for a cermet composition possessing at least equivalent mechanical properties, physical properties, or both of currently used materials while possessing superior corrosion resistance in comparison to currently used materials in applications involving, for example, high temperature, pressure, or both and that can be easily manufactured.

SUMMARY

The present invention is directed to a cermet composition, preferably a cemented carbide composition, more preferably a cobalt cemented tungsten carbide based composition (WC-Co), that satisfies the need for wear resistance, high elastic modulus, high compressive strength, high resistance to fracture, and, further, corrosion resistance in applications involving, for example, high temperature, high pressure, or both. The cermet may suitably comprise, consist essentially of, or consist of a ceramic component and a binder alloy comprised of major component (e.g., cobalt) and an additional component (e.g., one or more of ruthenium, rhodium, palladium, osmium, iridium, and platinum) to impart corrosion resistance to the composition. In a preferred embodiment, the cermet composition of the present invention exhibits corrosion resistance to acids and their solutions, more preferably organic acids and their solutions, and even more preferably carboxylic acids and their solutions including, for example, formic acid, acetic acid, maleic acid, methacrylic acid, their mixtures, or solutions.

The present invention is further directed to an apparatus or a part of an apparatus that is used in applications involving, for example, high temperature, high pressure, or both in corrosive environments. The apparatus or the part of an apparatus is comprised of a cermet that possesses the requisite physical, mechanical, and corrosion resistance properties. The apparatus or the part of the apparatus may suitably comprise, consist essentially of, or consist of articles used for materials processing including, for example, machining (included uncoated and coated materials cutting inserts), mining, construction, compression technology, extrusion technology, supercritical processing technology, chemical processing technology, materials processing technology, and ultrahigh pressure technology. Some specific examples include compressor plungers, for example, for extrusion, pressurization, and polymer synthesis; cold extrusion punches, for example, for forming wrist pins, bearing races, valve tappets, spark plug shells, cans, bearing retainer cups, and propeller shaft ends; wire flattening or tube forming rolls; dies, for example, for metal forming, powder compaction including ceramic, metal, polymer, or combinations thereof; feed rolls; grippers; and components for ultrahigh pressure technology.

Further, the apparatus or the part of the apparatus may suitably comprise, consist essentially of, or consist of plungers for hyper compressors, seal rings, orifice plates, bushings, punches and dies, bearings, valve and pump components (e.g., bearings, rotors, pump bodies, valve seats and valve stems), nozzles, high pressure water intensifiers, diamond compaction components (such as dies, pistons, rams and anvils), and rolling mill rolls which are used in corrosive environments. In a preferred embodiment, the apparatus or the part of an apparatus may suitably comprise a plunger for hyper compressors used in the manufacture of low density polyethylene (LDPE) or copolymer involving corrosive environments.

The invention illustratively disclosed herein may suitably be practiced in the absence of any element, step, component or ingredient which is not specifically disclosed herein.

DRAWINGS

These and other features, aspects, and advantages of the present invention will become better understood with reference to the following description, appended claims, and accompanying drawing where:

The FIGURE depicts schematically a portion of a hyper compressor used in the manufacture of low density polyethylene (LDPE) or copolymer incorporating a plunger comprised of a corrosion resistant cermet.

DETAILED DESCRIPTION

A corrosion resistant cermet of the present invention may suitably comprise, consist essentially of, or consist of at least one ceramic component and at least one binder, which when combined possess corrosion resistance. The at least one binder may suitably comprise, consist essentially of, or consist of a major component and an additional component, which when combined impart corrosion resistance to the cermet. The corrosion resistance includes the resistance to attack of a cermet by an environment (e.g., a solid, a liquid, a gas, or any combination of the preceding) either due to the (1) chemical inertness of a cermet, (2) formation of a protective barrier on a cermet from interactions of an aggressive environment and the cermet, or (3) both. The corrosion resistance may include any corrosion resistance in any environment, for example including environments comprised of acids, bases, salts, lubricants, gasses, silicates, or any combination of the preceding.

In a particularly preferred embodiment of the present invention when the cermet composition is used in a hyper compressor, the cermet composition of the present invention exhibits corrosion resistance to acids and their solutions, more preferably organic acids (e.g., a chemical compound: with one or more carboxyl radicals (COOH) in its structure; having a general formula designated by $R—(COOH)_n$ where n is an integer greater than or equal to one and R any appropriate functional group; or both) and their solutions, for example which may be described either by the Broested theory, Lewis theory, or both, and even more preferably carboxylic acids and their solutions including, for example, formic acid, acetic acid, maleic acid, methacrylic acid, their mixtures, or solutions.

In the formation of low density polyethylene (LDPE) or copolymers of ethylene, chemicals that may be part of or produced within the feedstock material of the process include oxygen, peroxides, azo compounds, alcohols, ketones, esters, alpha olefins or alkenes, (e.g., propylene and butene), vinyl acetate, acrylic acid, methacrylic acid, acrylates (e.g., methyl acrylate and ethyl acrylate), alkanes (e.g., n-hexane), their mixtures , or solutions. These chemicals, among others, may contribute to the formation of the aggressive environments in which a cermet composition of the present invention exhibits improved corrosion resistance.

In a preferred embodiment, a cermet composition of the present invention possesses corrosion rates measured after about seven(7) days:

(1) at about 50° C. (122° F.) in about one(1)% organic acid/water solutions of no greater than 300 m.d.d., preferably no greater than 120 m.d.d., more preferably no greater than 100 m.d.d., and even more preferably no greater than 80 m.d.d.;

(2) at about 65° C. (149° F.) in about five(5)% mineral acid/water solutions of no greater than 80 m.d.d., preferably no greater than 30 m.d.d., and more preferably no greater than 10 m.d.d.; or (3) any combination of the preceding.

A binder may suitably comprise any material that forms or assists in forming a corrosion resistant composition. A major component of a binder comprises one or more metals from IUPAC groups 8, 9 and 10; more preferably, one or more of iron, nickel, cobalt, their mixtures, and their alloys; and even more preferably, cobalt or cobalt alloys such as cobalt-tungsten alloys. An additive component of a binder comprises one or more metals from the platinum group metals of IUPAC groups 8, 9 and 10; more preferably, one or more of ruthenium, rhodium, palladium, osmium, iridium, platinum, their mixtures, and their alloys; and even more preferably, ruthenium or ruthenium alloys. Most preferably, the binder comprises cobalt-ruthenium or cobalt-ruthenium-tungsten alloys.

In an embodiment of the present invention an additive component of a binder comprises by weight about 5 percent (%) or less up to about 65% or more of the binder; preferably, about 10% or less up to about 60% or more; more preferably, about 16% or less up to about 40% or more; and even more preferably, about 26% or less up to about 34% or more.

A ceramic component may comprise at least one of boride(s), carbide(s), nitride(s), oxide(s), silicide(s), their mixtures, their solutions or any combination of the proceeding. The metal of the at least one of borides, carbide, nitrides, oxides, or silicides include one or more metals from International Union of Pure and Applied Chemistry (IUPAC) groups 2, 3 (including lanthanides and actinides), 4, 5, 6, 7, 8, 9, 10, 11, 12, 13 and 14. Preferably, the at least one ceramic component comprises carbide(s), their mixtures, their solutions or any combination of the proceeding. The metal of the carbide(s) comprises one or more metals from IUPAC groups 3 (including lanthanides and actinides), 4, 5, and 6; more preferably one or more of Ti, Zr, Hf, V, Nb, Ta, Cr, Mo and W; and even more preferably, tungsten.

Dimensionally, the grain size of the ceramic component, preferably carbide(s), of a corrosion resistant composition may range in size from submicrometer to about 420 micrometers or greater. Submicrometer includes nanostructured material having structural features ranging from about 1 nanometer to about 100 nanometers or more.

In an embodiment, the grain size of the ceramic component, preferably carbide(s) and more preferably, tungsten carbides, of a corrosion resistant composition ranges from about 0.1 micrometer to about 30 micrometers or greater with possibly a scattering of grain sizes measuring, generally, in the order of up to about 40 micrometers.

In an embodiment of the present invention, in addition to imparting corrosion resistance to the cermet composition, the cermet possesses at least equivalent physical properties, mechanical properties, or both as composition currently used in the same applications. Examples of these properties may include any of density, color, appearance, reactivity, electrical conductivity, strength, fracture toughness, elastic modulus, shear modulus, hardness, thermal conductivity, coefficient of thermal expansion, specific heat, magnetic susceptibility, coefficient of friction, wear resistance, impact resistance, etc., or any combination of the preceding.

In a preferred embodiment, a cermet comprising a tungsten carbide ceramic component and a cobalt-ruthenium or cobalt-ruthenium-tungsten alloy binder possesses a Rockwell A hardness from about 85–92 and more preferably from about 88–91; a transverse rupture strength from about 1.7–4.1 gigapascal (GPa) (250–600 kilopounds per sguare inch(ksi)), more preferably from about 2.1–3.7 GPa (310–540 ksi), and even more preferably from about 2.8–3.7 GPa (410–540 ksi); or any combination of the preceding.

The novel corrosion resistant cermet composition of the present invention is formed by providing a powder blend comprising at least one ceramic component, at least one binder, and optionally, at least one lube (an organic or inorganic material that facilitates the consolidations or agglomeration of the at least one ceramic component and at least one binder), at least one surfactant, or both. Methods for preparing a powder blend may include, for example, milling with rods or cycloids followed by mixing and then drying in, for example, a sigma blade type dryer or spray dryer. In any case, a powder blend is prepared by a means that is compatible with the consolidation or densification means or both when both are employed.

A powder blend comprises precursors to a ceramic component, a ceramic component, preferably carbide(s), or both having a preselected particle size or particle size distribution to form the desired ceramic component grain size or grain size distribution as discussed above.

A binder amount of a powder blend is pre-selected to tailor the properties, for example, to provide sufficient resistance to fracture, wear, or both, of the resultant cermet when an article comprised of the cermet is subjected to loadings and experiences stresses. The pre-selected binder content may range, by weight, between about 1–26% or more; preferably, between about 5–22%; more preferably, between about 6–19%; and even more preferably, between about 8–17%. These binder contents substantially reflect the binder content of the resultant cermet after densification.

A powder blend may be formed by any means including, for example, pressing, pouring; injection molding; extrusion; tape casting; slurry casting; slip casting; or and any combination of the preceding. Some of these methods are discussed in U.S. Pat. Nos. 4,491,559; 4,249,955; 3,888,662; and 3,850,368, which are incorporated by reference in their entirety in the present application.

In an embodiment of the present invention, a powder blend may be densified by, for example, pressing including, for example, uniaxial, biaxial, triaxial, hydrostatic, or wet bag (e.g., isostatic pressing) either at room temperature or at elevated temperature (e.g., hot pressing, hot isostatic pressing).

In any case, whether or not a powder blend is consolidated, its solid geometry may include any conceivable by a person skilled in the art. To achieve the direct shape or combinations of shapes, a powder blend may be formed prior to, during, and/or after densification. Prior forming techniques may include any of the above mentioned means as well as green machining or plastically deforming the green body or their combinations. Forming after densification may include grinding or any machining operations.

A green body comprising a powder blend may then be densified by any means that is compatible with making a corrosion resistant article of the present invention. A preferred means comprises liquid phase sintering. Such means include vacuum sintering, pressure sintering, hot isostatic pressing (HIPping), etc. These means are performed at a temperature and/or pressure sufficient to produce a substantially theoretically dense article having minimal porosity. For example, for cobalt cemented tungsten carbide based composition, such temperatures may include temperatures ranging from about 1300° C. (2373° F.) to about 1760° C. (3200° F.); preferably, from about 1400° C. (2552° F.) to about 1600° C. (2912° F.); and more preferably, from about 1400° C. (2552° F.) to about 1500° C. (2732° F.). Densification pressures may range from about zero (0) kPa (zero (0) psi) to about 206 MPa (30 ksi). For carbide articles, pressure sintering may be performed at from about 1.7 MPa (250 psi) to about 13.8 MPa (2 ksi) at temperatures from about 1370° C. (2498° F.) to about 1600° C. (2912° F.), while HIPping may be performed at from about 68 MPa (10 ksi) to about 206 MPa (30 ksi) at temperatures from about 1,310° C. (2373° F.) to about 1760° C. (3200° F.).

Densification may be done in the absence of an atmosphere, i.e., vacuum; or in an inert atmosphere, e.g., one or more gasses of IUPAC group 18; in carburizing atmospheres; in nitrogenous atmospheres, e.g., nitrogen, forming gas (96% nitrogen, 4% hydrogen), ammonia, etc.; or in a reducing gas mixture, e.g., $H_2/H_2O$, $CO/CO_2$, $CO/H_2/CO_2/H_2O$, etc.; or any combination of the preceding.

The present invention is illustrated by the following Examples. These Examples are provided to demonstrate and clarify various aspects of the present invention. The Examples should not be construed as limiting the scope of the claimed invention.

TABLE I

Ingredients Used to Make Samples A through E

| | |
|---|---|
| Tungsten Carbide Mix | 46 wt. % about 5.8 micrometer Tungsten Carbide<br>35 wt. % about 1.5 micrometer Tungsten Carbide<br>19 wt. % about 1.8 micrometer Tungsten Carbide |
| Tantalum Carbide | About 1.5 micrometer |
| Niobium Carbide | About 1.4 micrometer |
| Tungsten Powder | About 1 micrometer |
| Carbon | "RAVEN 410" carbon black<br>(Columbian Chemicals Co., Atlanta, GA) |
| Binder | Commercially available extrafine cobalt<br>−325 mesh (about 45 micrometers and below) ruthenium<br>−325 mesh (about 45 micrometer and below) rhenium |

Table I sets forth the ingredients of powder blends used to make Samples A, A', B, C, D, and E of the present Example. The powder blends were prepared substantially according to the methods described in U.S. Pat. No. 4,610,931, which methods are herein incorporated by reference. The binder content of Samples A, A', B, C, D, and E by weight ranged from about 11% to about 16% and were respectively, about 11.4%, 11.4%, 11.9%, 12.1%, 12.6%, and 15.6%. The binder of Samples A and A' comprised a cobalt alloy. The binder of Samples B, C, and E comprised a cobalt-ruthenium alloy comprised by weight from about 10% to about 26% ruthenium and were respectively about 10%, 20%, and 26% ruthenium. The binder of Sample D comprised a cobalt-rhenium alloy comprised by weight of about 15% rhenium. The weight percentage of the tungsten carbide mix of Samples A, A', B, C, and D comprised about 85% of the powder blend while that for Sample E comprised 81% (i.e., Sample E had a higher binder content than Samples A, A', B, C, and D). Additional ingredients Samples A, A', B, C, D, and E comprised by weight about two(2)% tantalum carbide, about half(0.5)% niobium carbide, about one(1)% tungsten metal powder and from about 0.3 to 0.9% carbon. Added to each powder blend for Samples A through E were about two(2)% paraffin wax lubricant and about 0.2% of surfactant.

After the powder blends for each of Samples A–E of the present Example was prepared, greenbodies were formed by pill pressing such that after densification (i.e., sintering and hot isostatic pressing) and grinding several specimens of Samples A through E measured about 5.1 millimeters (mm) square and 19.1 mm long (0.2 inch (in) square and 0.75 in long)and while others measured about 13 mm square and 5.1 mm thick (0.5 in square and about 0.2 in thick). A sufficient number of greenbodies of each of Samples A through E were made to facilitate the testing discussed and summarized in Tables II and IV below.

The greenbodies of Samples A through E were sintered for about 0.5 hour (hr) at about 1454° C. (2650° F.) with an argon gas pressure of about 600 micrometers of mercury (Hg); cooled to about 1200° C. (2192° F.) at about 20° C. (36° F.) per minute; and at about 1200° C. (2192° F.)the power to the furnace was turned off and the furnace and its contents were allowed to cool to about room temperature.

After sintering, the sintered bodies of Samples A–E were then hot isostatically consolidated at a temperature of about 1428° C. (2575° F.) and a pressure of about 113.8 MPa (16.5 ksi) in helium for about one hour.

The hardness, transverse rupture strength, Palmqvist fracture toughness, hot hardness, and corrosion rate of specimens of Samples A through E were determined. The mechanical properties are summarized in Table II and the corrosion results are summarized in Table IV. Sample A and A' were control materials comprised of a cobalt alloy binder.

TABLE II

Summary of Mechanical Properties

| | Sample A | Sample B | Sample C | Sample D | Sample A' | Sample E |
|---|---|---|---|---|---|---|
| **Nominal Binder Content** | | | | | | |
| | 11.4 wt % | 11.9 wt % | 12.1 wt % | 12.6 wt % | 11.4 wt % | 15.6 wt % |
| **Nominal Binder Composition (wt %)** | | | | | | |
| | Cobalt | 10 Ru Bal. Cobalt | 20 Ru Bal. Cobalt | 15 Re Bal. Cobalt | Cobalt | 26 Ru Bal. Cobalt |
| Rockwell A Hardness | 90.0 | 90.3 | 90.6 | 90.3 | 90.3 | 89.8 |
| Transverse Rupture Strength GPa (ksi) | 3.45 ± .22 (501 ± 32) | 3.48 ± .20 (505 ± 29) | 3.65 ± .08 (530 ± 11) | 3.61 ± .14 (523 ± 20) | 3.30 ± .17 (483 ± 25) | 3.19 ± .27 (463 ± 39)* |
| Palmqvist Fracture Toughness (kg/mm) | 143.4** | 127.4 | 118.1 | 128.0 | 130.9 | 147.0 |
| Vickers (1000 g load) Hot Hardness | | | | | | |
| 25° C. (77° F.) | 1406 | 1506 | 1501 | 1467 | 1411 | 1407 |
| 200° C. (392° F.) | 1240 | 1309 | 1346 | 1335 | 1322 | 1248 |
| 400° C. (752° F.) | 1108 | 1174 | 1200 | 1205 | 1116 | 1019 |
| 600° C. (1112° F.) | 897 | 896 | 888 | 982 | 894 | 739 |
| 800° C. (1472° F.) | 498 | 528 | 549 | 584 | 387 | 362 |

*3.20 ± .13 GPa (464 ± 19 ksi) results from Additional Measurement
**139.7 kg/mm results from Additional Measurement The Rockwell A hardness was measured at about room temperature by accepted industry methods. The hardnesses for Samples A through E measured from about 89.8–90.6. The substitution of the cobalt of the binder by about 20% by weight ruthenium appears to have moderately increased the hardness for Sample C above that for either Sample A or Sample A'.

The transverse rupture strength of Samples A through E was measured by a method similar to that describe in ASTM Designation: B-406-90 (see e.g., 1992 Annual Book of ASTM Standards Volume 02.05). The difference between the used procedure and the ASTM designation were (1) the replacement of the two ground-cemented-carbide cylinders with ground-cemented-carbide balls each having an about 10 mm (0.39 in) diameter, (2) the replacement of the ground-cemented-carbide ball with a ground-cemented-carbide cylinder having an about 12.7 mm (0.5 in) diameter, and (3) the use of 12 specimens per Sample material, each specimen measuring about 5.1 mm square and 19.1 mm long (0.2 in square and 0.75 in long). The results of these measurements demonstrate that the addition of either ruthenium or rhenium to the binder does not significantly effect the transverse rupture strength of Samples B through E as compared to Samples A and A'. For Samples A through E the transverse rupture strength ranged from about 3.2–3.7 GPa (460–530 ksi).

The fracture toughness of Samples A through E was determined by the Palmqvist method. That is specimens of Samples A through E measuring at least about 13 mm square by about 5.1 mm thick (about 0.5 in square by about 0.2 in thick) were prepared. The specimens were mounted and their surfaces polished first with an about 14 micrometer average particle size (600 grit) diamond disc for about one(l) minute using an about 15 kilogram (kg) (33 pound (lb.)) load. The specimen surfaces were further polished using diamond polishing pastes and a commercially available polishing lubricant under an about 0.6 kg (1.3 lb.) load first with each of an about 45 micrometer, an about 30 micrometer, and an about 9 micrometer diamond paste each for about 0.5 hr; and then with each of an about 6 micrometer, an about 3 micrometer, and an about 1 micrometer diamond paste each for about 0.3 hr.

TABLE III

Summary of Corrosion Testing

| | |
|---|---|
| Apparatus Used For Corrosion Test | 1000 milliliter widemouthed Erlenmeyer Flask equipped with a Allihn condenser (400 mm long) containing a PTFE[♦] sample support rack to facilitate contact of test solution and test specimen<br>heated within 2° C.(3.6° F.) of test temperature and monitored with mercury thermometer |
| Test Solution | 600 milliliters of test solution<br>made from analytical reagent grade chemicals<br>made from deionized water if aqueous<br>nonaerated and nonagitated<br>minimum 0.4 $ml/mm^2$ (volume/area) ratio[Δ] |
| Test Specimen Dimensions | About 5.1 mm square and 19.1 mm long<br>About 439 $mm^2$ area[θ] |
| Preparation Treatment For Test Specimens | 1) Grind on 220 grit diamond wheel<br>2) Finish to 0.2 micrometer (one(1) microinch)<br>3) Measure specimen dimensions with micrometer<br>4) Scrub with soft cloth soaked in mild alkaline detergent♣ containing no bleaching agents<br>5) Ultrasonically clean for 3 minutes in each of:<br>a) mild alkaline detergent♣<br>b) deionized or distilled water<br>c) isopropanol<br>6) Dry for 5 minutes at about 105° C.(221° F.)<br>7) Cool in desiccator to room temperature<br>8) Weigh to within +0.1 milligrams |
| Treatment After Test | 1) Repeat Step 4) through Step 8) from Preparation Treatment |

♦"TEFLON ®" polytertraflouroethylene;

♣"MICRO ®" liquid laboratory cleaner, Cole-Parmer Instrument Co., Chicago, ILL;

θ0.2 in square by 0.75 in long and 0.68 $in^2$ area;

Δ250 milliliter test solution/$in^2$ surface area

A Vickers standard diamond indenter was used to make three indentations separated by at least 1.9 mm (0.075 in) using an about 30 kg (66 lb.), 60 kg (132 lb.), 90 kg (198 lb.), and 120 kg (265 lb.) load. The lengths of the cracks emanating vertically from each indent and the corresponding indentation diagonal were measured. The applied loads were plotted as function of emanating vertical crack lengths. The slope of the plot is the Palmqvist fracture toughness reported in Table II.

The results indicate that there might be a moderate decrease in fracture toughness by the alloying the binder with either ruthenium or rhenium (see Sample B through D). However, the decrease may be mitigated by increasing the amount of binder in a cermet as demonstrated by the increased fracture toughness of Sample E relative to Sample A through D.

Hot hardness test results show that there is no significant decrease in hot hardness with the substitution of ruthenium or rhenium for cobalt.

The corrosion testing of Samples A through E was based on the practice described in ASTM Designation: G-31-72 (see e.g., 1992 Annual Book of ASTM Standards Volume 03.02). Table III summarizes the details of the corrosion testing. Corrosion rates after about one(1) day and after about seven(7) days at about 50° C. (122° F.) , expressed as milligrams of material lost per square decimeter per day (m.d.d.), were determined for acid solutions, particularly organic acid solutions, comprised of formic acid, acetic acid, maleic acid and methacrylic acid. The solutions included by weight about one(1)% of the acid and the balance distilled and deionized water. An additional solution included about one(1)% by weight maleic acid with the balance methanol. The corrosion coupons for Samples A through E measured half the length reported in Table III and two(2) specimens of each Sample were tested. On the basis of the measured surface area and weight loss the one(1) day and seven(7) day corrosion rates were calculated. The specimens were also examined metallographically to determine the depth of loss and the character of the loss. These results are summarized in Table IV.

TABLE IV

Summary of Corrosion Tests

| | Sample A | | Sample C | | Sample E | |
|---|---|---|---|---|---|---|
| | Nominal Binder Content | | | | | |
| | 11.4 wt % | | 12.1 wt % | | 15.6 wt % | |
| | Nominal Binder Composition (wt %) | | | | | |
| | Cobalt | | 20 Ru Bal. Cobalt | | 26 Ru Bal. Cobalt | |
| Corrosion Results | Rate (m.d.d.) ▽ | Depth (micrometers) | Rate (m.d.d.) ▽ | Depth (micrometers) | Rate (m.d.d.) ▽ | Depth (micrometers) |
| After One Day at 50° C. (122° F.) | | | | | | |
| 1% Formic Acid/ Water | 244 | 13[5] | 86 | 2[1] | 71 | 2[1] |

TABLE IV-continued

Summary of Corrosion Tests

| | Sample A | | Sample C | | Sample E | |
|---|---|---|---|---|---|---|
| | Nominal Binder Content | | | | | |
| | 11.4 wt % | | 12.1 wt % | | 15.6 wt % | |
| | Nominal Binder Composition (wt %) | | | | | |
| | Cobalt | | 20 Ru Bal. Cobalt | | 26 Ru Bal. Cobalt | |
| Corrosion Results | Rate (m.d.d.) ∇ | Depth (micrometers) | Rate (m.d.d.) ∇ | Depth (micrometers) | Rate (m.d.d.) ∇ | Depth (micrometers) |
| 1% Acetic Acid/Water | 289 | $18^{4.5}$ | 110 | $15^{2.5}$ | 50 | $10^{1.5}$ |
| 1% Maleic Acid/Methanol | 470 | $26^{4.5}$ | 3 | 2 | 3 | 1 |
| 1% Maleic Acid/Water | 321 | $12^{3}$ | 398 | $48^{3}$ | 112 | $50^{1}$ |
| 1% Methacrylic Acid/Water | 236 | $14^{4.5}$ | 115 | $26^{1}$ | 66 | $3^{2.5}$ |
| After 7 Days at 50° C. (122° F.) | | | | | | |
| 1% Formic Acid/Water | 225 | $91^{4.5}$ | 85 | $2^{1}$ | 69 | $1^{0.5}$ |
| 1% Acetic Acid/Water | 151 | $72^{4.5}$ | 95 | $73^{3.5}$ | 94 | $3^{2}$ |
| 1% Maleic Acid/Methanol | 279 | $87^{3.5}$ | 2 | 1 | 0.1 | 1 |
| 1% Maleic Acid/Water | 127 | $53/325^{4.5}$ | 283 | $224^{3.5}$ | 120 | $5^{4.0/1.5}$ |
| 1% Methacrylic Acid/Water | 203 | $89^{3.5}$ | 107 | $133^{3}$ | 79 | 1 |

∇ m.d.d. is milligrams of material lost per square decimeter per day

♣ the degree of loss of material has been classified subjectively: 1 indicates corrosion of only about 5% of the binder; 3 indicates complete corrosion of the binder for the indicated depth; 5 indicates corrosion of both the binder and about 50% of the carbide ceramic component.

The results of corrosion testing indicate that Sample C and Sample E are in general more corrosion resistant than Sample A. One exception appears to be the corrosion rate of Sample C and Sample E in the maleic acid/water solution, where the rate is greater for Sample C and substantially unchanged for Sample E.

Thus these examples demonstrate that alloying the binder with ruthenium while increasing the binder content of a cermet, particularly a cobalt cemented tungsten carbide, substantially maintains the mechanical properties of the cermet while significantly improving its corrosion resistance.

TABLE V

Ingredients Used to Make Samples F through J

| | |
|---|---|
| Tungsten Carbide Mix | about 35 wt. % about 2.2 micrometer WC<br>about 65 wt. % about 4.5 micrometer WC |
| Tantalum Carbide | About 10 micrometer |
| Titanium Nitride | About 1.4 micrometer |
| Carbon | "RAVEN 410" carbon black<br>(Columbian Chemicals Co., Atlanta, GA) |
| Binder | Commercially available extrafine cobalt<br>−325 mesh (about 45 micrometers and below)<br>ruthenium |

Table V sets forth the ingredients of powder blends used to make Samples F through J. The powder blends were prepared substantially according to the methods used in Samples A through E. The nominal binder content and nominal binder composition of Samples F through J are summarized in Table VI. Additional ingredients of Samples F through J comprised by weight about six (6)% tantalum carbide, about 2.5% titanium nitride, about 0.2% carbon, and the balance the tungsten carbide mix set forth in Table V. Added to each powder blend for Samples F through G were about two (2)% by weight paraffin wax lubricant and about 0.2% by weight surfactant.

After the powder blends for each of Samples F through J were prepared, a sufficient number of greenbodies of each of Samples F through J were pill pressed to facilitate the testing summarized in Table VI below.

The greenbodies of Samples F through J were densified substantially according to the method used for Samples A through E except that the sintering temperature was about 1649° C. (3000° F.) for about 0.5 hr for Sample F through I specimens and about 1704° C. (3100° F.) for Sample J specimens.

The hardness, transverse rupture strength, and corrosion rate of specimens of Samples F through J were determined substantially according to the methods used for Samples A through E and the results are summarized in Table VI. Corrosion rates after about seven (7) days at about 65° C. (149° F.) were determined for acid solutions, particularly mineral acid solutions, comprised of sulfuric acid, nitric acid, and hydrochloric acid. The acid concentration in the distilled and deionized water solutions are summarized in Table VI. Additional test solutions included synthetic sea water and hydrazine mono-hydrate. The corrosion coupons for Samples F through J measured the length reported in Table III and two(2) specimens of each Sample were tested.

Thus these examples demonstrate that adding ruthenium to the binder of a cermet, particularly a cobalt cemented tungsten carbide, imparts corrosion resistance to the cermet in environments in addition to organic acids.

The previously described versions of the present invention have many advantages, including the use of a corrosion resistant cermet composition for a plunger for hyper compressors used in the manufacture of low density polyethylene (LDPE) or copolymer. FIG. 1 schematically depicts such a plunger 103 contained within a portion of a hyper compressor 101. The plunger 103 comprises an elongated body 119 having a first end 117 and a second end 121. The surface 123 of the elongated body 119 may have a mirror-like finish and engages seals 115 of a seal assembly 113 contained within a portion of a hyper compressor body 125. The second end 121 of the plunger 103 comprises an attachment means which facilitates the reciprocation of the plunger 103 to compress materials introduced into the compression chamber 111 through feed stream 107. A coupling means 105 attached to a drive means (not shown) and a reciprocation guide means 127 drives plunger 103 within compression chamber 111 to create a prescribed pressure with the feed stock materials which are then ejected through exit stream 109.

TABLE VI

Summary of Mechanical Properties and Corrosion Tests

| | Sample F | Sample G | Sample H | Sample I | Sample J |
|---|---|---|---|---|---|
| | 6.2 wt % 26 Ru Bal. Cobalt | 6.6 wt % 32 Ru Bal. Cobalt | 6.7 wt % 38 Ru Bal. Cobalt | 7.2 wt % 58 Ru Bal. Cobalt | 7.2 wt % 58 Ru Bal. Cobalt |
| Nominal Binder Content | 1649° | 1649° | 1649° | 1649° | 1704° |
| Nominal Binder Composition | C. | C. | C. | C. | C. |
| (wt %) | (3000° | (3000° | (3000° | (3000° | (3100° |
| Sintering Temperature | F.) | F.) | F.) | F.) | F.) |
| Rockwell A Hardness | 92.4 | 92.5 | 92.4 | 92.9 | 92.9 |
| Transverse Rupture | 1.77 | 1.56 | 1.33 | 1.39 | 1.31 |
| Strength GPa (ksi) | (256) | (226) | (193) | (202) | (190) |
| Corrosion Rate (m.d.d.)▽ After 7 Days at 65° C. (149° F.) | | | | | |
| Synthetic Sea Water♣ | 2 | 6 | 4 | 1 | 1 |
| 5% Sulfuric Acid/ Water | 74 | 22 | 6 | 3 | 2 |
| 5% Nitric Acid/ Water | 3 | 6 | 3 | 10 | 11 |
| 37% Hydrochloric/ Water | 8 | 7 | 4 | 2 | 0.6 |
| 98% Hydrazine Mono-hydrate/Water | 1 | 0.3 | 0.3 | 2 | 0.3 |

▽m.d.d. is milligrams of material lost per square decimeter per day

♣The synthetic sea water comprised 23,700 ppm $Cl^{1-}$, 10,000 ppm $Na^{1+}$, 2,800 ppm $Mg^{2+}$, 2,000 ppm $SO_4^{2-}$, 790 ppm $Ca^{2+}$, 600 ppm $Br^{1-}$, and 160 ppm $K^{1+}$ in $H_2O$.

Although the present invention has been described in considerable detail with reference to certain preferred versions, other versions are possible. For example, a cermet compositions might be adapted for use in any application involving corrosive environments including, and not limited to, the applications previously enumerated. Therefore, the spirit and scope of the appended claims should not be limited to the description of the preferred versions contained herein.

What is claimed is:

1. A plunger for use in a hyper compressor comprising:

(a) an elongated body;

(b) a first end;

(c) a second end, wherein the second end further comprises an attachment that facilitates the reciprocation of the plunger within a portion of the a hyper compressor; and (d) a surface extending between the first end and the second end, at least a portion the plunger being comprised of a corrosion and wear resistant cermet composition comprising:

(i) at least one ceramic component, wherein the at least one ceramic component comprises at least one of boride(s), carbide(s), nitride(s), oxide(s), silicide(s), their mixtures, their solutions, and combinations thereof; and (ii) between about 6–19% by weight binder alloy consisting essentially of a major component and between about 26–60% by weight of an additive component, wherein the major component consists of one or more of iron, nickel, cobalt, their mixtures, and their alloys; the additive component consists of at least one of ruthenium, rhodium, palladium, osmium, iridium, platinum, their mixtures and their alloys; and the interaction of the major component and the additive component imparts corrosion resistance to the plunger.

2. The plunger according to claim 1, wherein the additive component comprises ruthenium that comprises between about 26–40% by weight of the binder alloy.

3. The plunger according to claim 1, wherein the plunger is resistant to at least one of acids, bases, salts, lubricants, gasses, silicates, or any combination of the preceding due to the corrosion and wear resistant cermet composition.

4. The plunger according claim 1, wherein the at least one ceramic component comprises at least one carbide of one or more of Ti, Zr, Hf, V, Nb, Ta, Cr, Mo, and W.

5. The plunger of claim 1, wherein the at least one ceramic component comprises tungsten carbide.

6. The plunger according to claim 5, wherein the at least one ceramic component further comprises at least one carbide of one or more of Ti, Nb, and Ta.

7. The plunger according to claim 1, wherein the plunger is resistant to organic acidic solutions due to the corrosion and wear resistant cermet composition.

8. The plunger according claim 7, wherein the corrosion rate of the corrosion and wear resistant cermet composition of the plunger after about seven(7) days at about 50° C. (122° F.) is not greater than about 300 m.d.d. in a one(1)% organic acid/water solution.

9. The plunger according to claim 1, wherein the plunger is corrosion resistant to solutions of water and at least one of formic acid, acetic acid, maleic acid, and methacrylic acid due to the corrosion and wear resistant cermet composition.

10. The plunger according to claim 9, wherein the corrosion rate of the corrosion and wear resistant cermet composition of the plunger after about seven(7) days at about 50° C. (122° F.) is not greater than about 120 m.d.d.

11. The plunger according to claim 1, wherein the plunger is corrosion resistant to solutions of water and at least one of sulfuric acid, nitric acid, hydrochloric acid, salt, and hydrazine mono-hydrate due to the corrosion and wear resistant cermet composition.

12. The plunger according to claim 11, wherein the corrosion rate of the corrosion and wear resistant cermet composition of the plunger after about seven(7) days at about 65° C. (149° F.) is not greater than about 80 m.d.d.

13. The plunger according to claim 1, wherein the additive component comprises ruthenium that comprises between about 26–34% by weight of the binder alloy.

14. The plunger according to claim 1, wherein the additive component comprises between about 26–34% by weight of the binder.

15. The plunger according to claim 1, wherein the corrosion rate of the corrosion and wear resistant cermet composition of the plunger after about seven(7) days at about 65° C. (149° F.) is not greater than about 80 m.d.d. in five(5)% mineral acid/water solutions.

16. A plunger for use in a hyper compressor comprising:

(a) an elongated body;

(b) a first end;

(c) a second end, wherein the second end further comprises an attachment that facilitates the reciprocation of the plunger within a portion of the a hyper compressor; and (d) a surface extending between the first end and the second end, at least a portion of the plunger being comprised of a corrosion and wear resistant cermet composition comprising:

(i) at least tungsten carbide; and (ii) between about 6–19% by weight binder alloy consisting essentially of cobalt and between about 26–60% by weight ruthenium, wherein the interaction of cobalt and ruthenium imparts corrosion resistance to the plunger.

17. The plunger according to claim 16, wherein ruthenium comprises up to about 40% by weight of the binder alloy.

18. The plunger according to claim 16, wherein ruthenium comprises up to about 34% by weight of the binder alloy.

19. The plunger according to claim 16, further comprising at least one carbide of one or more of Ti, Nb, and Ta.

20. The plunger according to claim 16, wherein the corrosion rate of the corrosion and wear resistant cermet composition of the plunger after about seven(7) days at about 50° C. (122° F.) in solutions of water and at least one of formic acid, acetic acid, maleic acid, and methacrylic acid is not greater than about 120 m.d.d.

21. The plunger according to claim 16, wherein the corrosion rate of the corrosion and wear resistant cermet composition of the plunger after about seven(7) days at about 65° C. (149° F.) in a solution of water and at least one of sulfuric acid, nitric acid, hydrochloric acid, salt, and hydrazine mono-hydrate is not greater than about 80 m.d.d.

22. The plunger according claim 16, wherein the corrosion rate of the corrosion and wear resistant cermet composition of the plunger after about seven(7) days at about 50° C. (122° F.) is not greater than about 300 m.d.d. in a one(1)% organic acid/water solution.

23. The plunger according to claim 16, wherein a corrosion rate of the corrosion and wear resistant cermet composition of the plunger in a five(5)% mineral acid/water solution after about seven(7) days at about 65° C. (149° F.) is not greater than about 80 m.d.d.

24. The plunger according to claim 16, wherein the binder alloy comprises between about 8–17% by weight of the corrosion and wear resistant cermet composition.

25. A plunger for use in a hyper compressor comprising:

(a) an elongated body;

(b) a first end;

(c) a second end; and (d) a surface extending between the first end and the second end, the plunger being comprised of a corrosion and wear resistant cermet composition comprising:

(i) at least tungsten carbide and (ii) between about 6–19% by weight binder alloy consisting essentially of cobalt or cobalt alloys and between about 26–60% by weight ruthenium, wherein the interaction of the cobalt or cobalt alloys and the ruthenium imparts corrosion resistance to the plunger.

26. The plunger according to claim 25, wherein weight binder alloy consists essentially of cobalt or cobalt alloys and between about 26–40% by weight ruthenium.

27. The plunger according claim 25, further comprising at least one carbide of one or more of Ti, Nb, and Ta.

28. The plunger according to claim 25, wherein weight binder alloy consists essentially of cobalt or cobalt alloys and between about 26–34% by weight ruthenium.

29. The plunger according claim 28, further comprising at least one carbide of one or more of Ti, Nb, and Ta.

30. The plunger according claim 25, further comprising at least one carbide of one or more of Ti, Nb, and Ta.

31. The plunger according to claim 25, wherein the corrosion rate of the corrosion and wear resistant cermet composition of the plunger after about seven(7) days at about 50° C. (122° F.) in a solution of water and at least one of formic acid, acetic acid, maleic acid, and methacrylic acid is not greater than about 120 m.d.d.

32. The plunger according to claim 25, wherein the corrosion rate of the corrosion and wear resistant cermet composition of the plunger after about seven(7) days at about 65° C. (149° F.) in a solution of water and at least one of sulfuric acid, nitric acid, hydrochloric acid, salt, and hydrazine monohydrate is not greater than about 80 m.d.d.

33. The plunger according claim 25, wherein the corrosion rate of the corrosion and wear resistant cermet composition of the plunger after about seven(7) days at about 50° C. (122° F.) in a one(1)% organic acid/water solution is not greater than about 300 m.d.d.

34. The plunger according to claim 25, wherein the corrosion rate of the corrosion and wear resistant cermet composition of the plunger after about seven(7) days at about 65° C. (149° F.) in a five(5)% mineral acid/water solution is not greater than about 80 m.d.d.

35. The plunger according to claim 25, wherein the binder alloy comprises between about 8–17% by weight of the corrosion and wear resistant cermet composition.

* * * * *